(12) United States Patent
Hase et al.

(10) Patent No.: US 12,520,050 B2
(45) Date of Patent: Jan. 6, 2026

(54) LIQUID CRYSTAL PANEL, IMAGING SYSTEM MODULE, AND IMAGING APPARATUS

(71) Applicant: Japan Display Inc., Tokyo (JP)

(72) Inventors: Kasumi Hase, Tokyo (JP); Koichi Igeta, Tokyo (JP); Yoshiro Aoki, Tokyo (JP)

(73) Assignee: JAPAN DISPLAY INC., Tokyo (JP)

( * ) Notice: Subject to any disclaimer, the term of this patent is extended or adjusted under 35 U.S.C. 154(b) by 0 days.

(21) Appl. No.: 19/073,017

(22) Filed: Mar. 7, 2025

(65) Prior Publication Data

US 2025/0287115 A1    Sep. 11, 2025

(30) Foreign Application Priority Data

Mar. 11, 2024  (JP) ................. 2024-037290

(51) Int. Cl.
*H04N 23/95* (2023.01)
*G02F 1/1347* (2006.01)
*G02F 1/137* (2006.01)
*H04N 13/00* (2018.01)
*H04N 13/204* (2018.01)

(52) U.S. Cl.
CPC ........... *H04N 23/95* (2023.01); *G02F 1/1347* (2013.01); *G02F 1/13725* (2013.01); *H04N 13/204* (2018.05); *H04N 2013/0081* (2013.01)

(58) Field of Classification Search
CPC ... G02F 1/1347; G02F 1/13725; H04N 23/95; H04N 13/204; H04N 2013/0081
See application file for complete search history.

(56) References Cited

U.S. PATENT DOCUMENTS

| | | | | |
|---|---|---|---|---|
| 7,349,043 | B2* | 3/2008 | Sumiyoshi | G02F 1/1323 349/112 |
| 8,659,722 | B2* | 2/2014 | Kaifu | H04N 23/75 349/86 |
| 8,743,297 | B2* | 6/2014 | Kaifu | G02F 1/133553 349/2 |
| 10,825,958 | B2* | 11/2020 | Heintzelman | H10H 20/833 |
| 11,509,882 | B2* | 11/2022 | Zhang | G02B 30/25 |

(Continued)

OTHER PUBLICATIONS

Zhou et al., "Coded Aperture Pairs for Depth from Defocus and Defocus Deblurring", International Journal of Computer Vision, vol. 93, No. 1, May 2011, pp. 1-17.

*Primary Examiner* — Boubacar Abdou Tchoussou
(74) *Attorney, Agent, or Firm* — XSENSUS LLP

(57) ABSTRACT

A liquid crystal panel for forming an aperture for an incident light includes guest-host liquid crystals, and includes first and second cells arranged such that one cell surface of them are in contact with each other. The liquid crystals of the first cell can be oriented in a first direction vertical to a direction of an optical axis of the panel or the direction of the optical axis. The liquid crystals of the second cell can be oriented in a second direction vertical to both the direction of the optical axis and the first direction or the direction of the optical axis. In the panel, the orientation direction of the liquid crystals at each region is controlled by an electric field, to form an aperture with high contrast for range imaging and an aperture with high light transmissivity for general imaging.

13 Claims, 11 Drawing Sheets

(56) References Cited

U.S. PATENT DOCUMENTS

2004/0012753 A1* 1/2004 Udaka .................... H04N 23/75
 349/187
2005/0195313 A1* 9/2005 Tsuji ...................... G03B 7/095
 348/362

* cited by examiner

FIG. 11
|  | MODE | |
| --- | --- | --- |
|  | NORMALLY CLOSED | NORMALLY OPEN |
| DRIVING MODE | ECB MODE | VA MODE |
| VOLTAGE AT OFF | ABSORPTION (COLORED) CASE | TRANSPARENT |
| VOLTAGE AT ON | TRANSPARENT | ABSORPTION (COLORED) CASE |
| LIQUID CRYSTAL | POSITIVE | NEGATIVE |
| ORIENTATION DIRECTION | HORIZONTAL | VERTICAL |
| RESPONSE TIME | SEVERAL TENS OF msec | SEVERAL TENS OF msec |
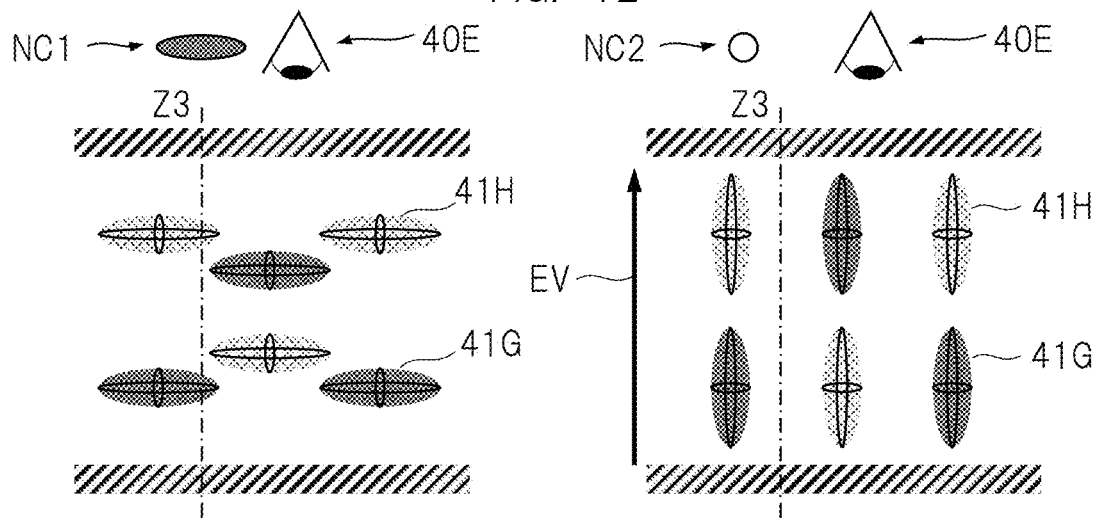
FIG. 12
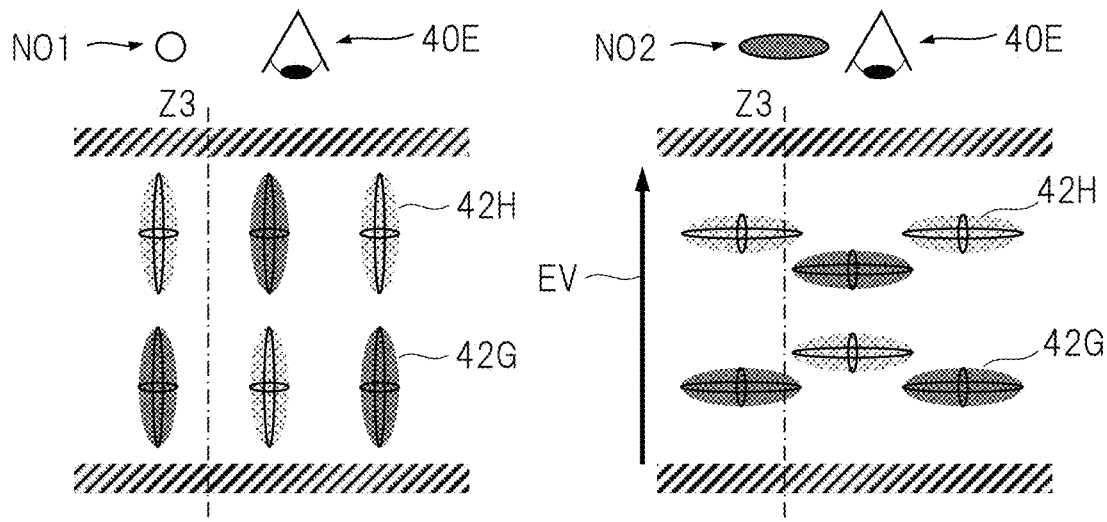
FIG. 13

LIQUID CRYSTAL PANEL, IMAGING SYSTEM MODULE, AND IMAGING APPARATUS

CROSS-REFERENCE TO RELATED APPLICATION

The present application claims priority to Japanese Patent Application No. 2024-037290 filed on Mar. 11, 2024, the disclosure of which is incorporated herein by reference.

TECHNICAL FIELD OF THE INVENTION

The present disclosure relates to a liquid crystal panel, an imaging system module, and an imaging apparatus.

BACKGROUND OF THE INVENTION

Ranging techniques each for measuring a distance between an imaging system and an object by imaging the object and analyzing an obtained captured image. As imaging used in such a ranging technique, for example, coded imaging, stereo imaging and the like have been known.

The ranging technique using the coded imaging is called DFD (Depth From Defocus). The DFD technique is a technique of estimating the distance from the imaging apparatus to the object, i.e., the depth or perspective of the object, based on the degree of edge blurring that appears in the image obtained by the coded imaging.

The DFD technique is described in, for example, "[Coded Aperture Pairs for Depth from Defocus and Defocus Deblurring], C. Zhou, S. Lin and S. K. Nayar, International Journal of Computer Vision, Vol. 93, No. 1, pp. 53, May. 2011 (Non-Patent Document 1)". In the DFD technique, coded imaging is performed in which a mask that is called coded aperture is arranged in a light entrance region of the optical system and an image of the object is captured. Next, the captured image obtained by the coded imaging is decoded based on a PSF (Point Spread Function) specific to the imaging system including the mask, and the distance to the object is estimated.

SUMMARY OF THE INVENTION

Such a ranging technique based on the captured image has room to be improved in practical use. Under the much circumstances, it is desirable to further improve practical use of the ranging technique based on the captured image.

The outline of the typical aspects of the inventions disclosed in the present application will be briefly described as follows.

According to one typical embodiment of the present invention, a liquid crystal panel includes: a first liquid crystal cell; and a second liquid crystal cell. The first liquid crystal cell and the second liquid crystal cell are arranged such that one cell surface of the first liquid crystal cell and one cell surface of the second liquid crystal cell are in contact with or close to face each other and such that an optical axis of the first liquid crystal cell and an optical axis of the second liquid crystal cell are parallel to or overlap with each other. In an incident light control region of the first liquid crystal cell, the first liquid crystal cell is configured to include first guest-host liquid crystals capable of taking an orientation direction to be a first direction vertical to a direction of the optical axis of the first liquid crystal cell or to be the direction of the optical axis, and configured to change in the orientation direction of the first guest-host liquid crystals at each region when being controlled by an electric field at the region in the incident light control region of the first liquid crystal cell, to form a first aperture pattern functioning as an aperture for range imaging and a second aperture pattern functioning as an aperture for non-range imaging. In an incident light control region of the second liquid crystal cell, the second liquid crystal cell is configured to include second guest-host liquid crystals capable taking an orientation direction to be a second direction vertical to a direction of the optical axis of the second liquid crystal cell and vertical to the first direction or to be the direction of the optical axis, and configured to change in the orientation direction of the second guest-host liquid crystals at each region when being controlled by an electric field at the region in the incident light control region of the second liquid crystal cell, to form the first aperture pattern and the second aperture pattern.

According to another typical embodiment of the present invention, an imaging system module includes: an optical system, a liquid crystal panel, and an imaging element. The imaging element receives light passing through the optical system and the liquid crystal panel. The liquid crystal panel includes: a first liquid crystal cell; and a second liquid crystal cell. The first liquid crystal cell and the second liquid crystal cell are arranged such that one cell surface of the first liquid crystal cell and one cell surface of the second liquid crystal cell are in contact with or close to face each other and such that an optical axis of the first liquid crystal cell and an optical axis of the second liquid crystal cell are parallel to or overlap with each other. In an incident light control region of the first liquid crystal cell, the first liquid crystal cell is configured to include first guest-host liquid crystals capable of taking an orientation direction to be a first direction vertical to a direction of the optical axis of the first liquid crystal cell or to be the direction of the optical axis, and configured to change in the orientation direction of the first guest-host liquid crystals at each region when being controlled by an electric field at the region in the incident light control region of the first liquid crystal cell, to form a first aperture pattern functioning as an aperture for range imaging and a second aperture pattern functioning as an aperture for non-range imaging. In an incident light control region of the second liquid crystal cell, the second liquid crystal cell is configured to include second guest-host liquid crystals capable of taking an orientation direction to be a second direction vertical to a direction of the optical axis of the second liquid crystal cell and vertical to the first direction or to be the direction of the optical axis, and configured to change in the orientation direction of the second guest-host liquid crystals at each region when being controlled by an electric field at the region in the incident light control region of the second liquid crystal cell, to form the first aperture pattern and the second aperture pattern.

According to still another typical embodiment of the present invention, an imaging apparatus includes: an optical system, a liquid crystal panel, an imaging element, and a controller. The imaging element receives light passing through the optical system and the liquid crystal panel. The liquid crystal panel includes: a first liquid crystal cell; and a second liquid crystal cell. The first liquid crystal cell and the second liquid crystal cell are arranged such that one cell surface of the first liquid crystal cell and one cell surface of the second liquid crystal cell are in contact with or close to face each other and such that an optical axis of the first liquid crystal cell and an optical axis of the second liquid crystal cell are parallel to or overlap with each other. In an incident light control region of the first liquid crystal cell, the first liquid crystal cell is configured to include first guest-host liquid crystals capable of taking an orientation direction to be a first direction vertical to a direction of the optical axis of the first liquid crystal cell or to be the direction of the optical axis, and configured to change in the orientation direction of the first guest-host liquid crystals at each region when being controlled by an electric field at the region in the incident light control region of the first liquid crystal cell, to form a first aperture pattern functioning as an aperture for range imaging and a second aperture pattern functioning as an aperture for non-range imaging. In an incident light control region of the second liquid crystal cell, the second liquid crystal cell is configured to include second guest-host liquid crystals capable of taking an orientation direction to be a second direction vertical to a direction of the optical axis of the second liquid crystal cell and vertical to the first direction or to be the direction of the optical axis, and configured to change in the orientation direction of the second guest-host liquid crystals at each region when being controlled by an electric field at the region in the incident light control region of the second liquid crystal cell, to form the first aperture pattern and the second aperture pattern. The controller is configured to control the liquid crystal panel and the imaging element such that the first aperture pattern is formed in the first liquid crystal cell and the second liquid crystal cell to perform the range imaging, and configured to control the liquid crystal panel and the imaging element such that the second aperture pattern is formed in the first liquid crystal cell and the second liquid crystal cell to perform the non-range imaging.

BRIEF DESCRIPTIONS OF THE DRAWINGS

FIG. 11 is a diagram illustrating modes of guest-host liquid crystals;

FIG. 12 is a diagram for explaining a property of guest-host liquid crystals in a normally closed mode;

FIG. 13 is a diagram for explaining a property of guest-host liquid crystals in a normally open mode;

DESCRIPTIONS OF THE PREFERRED EMBODIMENTS

Background of Study Made by Present Inventors

The background of the study made by the present inventors will be described prior to describing embodiments of the present invention.

As the imaging apparatus for ranging the object, the present inventors have studied an imaging apparatus including a liquid crystal panel being arranged in front of an optical system such as a lens, and displaying a geometric pattern onto the liquid crystal panel to function the geometric pattern as an aperture for the range imaging. The range imaging is, for example, coded imaging or stereo imaging as described above. To the contrary, when the range imaging is not performed in such an imaging apparatus, the non-range imaging or the general imaging is desirably enabled. In the general imaging, an aperture pattern having a circle shape centering on an optical axis of the liquid crystal panel is formed on the liquid crystal panel.

However, a typical liquid crystal panel includes a polarizer. The polarizer is high in light absorptivity and low light transmissivity in the liquid crystal panel, and thus, light received by an imaging element is less, and it is difficult to form a bright and detail image. Liquid crystal panels each using the guest-host liquid crystals have been known. Such a guest-host liquid crystal panel does not need the polarizer, and thus, the light transmissivity is high while the light absorptivity in a light shielding region is low due to the liquid crystals. Thus, the guest-host liquid crystal panel is not suitable for the range imaging since contrast of a displayed geometric pattern that is an aperture pattern is low.

Due to the above circumstances, a liquid crystal panel has been awaited, the liquid crystal panel keeping its contrast when forming the aperture pattern functioning as the aperture for the range imaging while being high in the light transmissivity when forming the aperture pattern functioning as the aperture for the non-range imaging that is the aperture for the general imaging. In other words, a liquid crystal panel has been awaited, the liquid crystal panel being capable of forming the aperture pattern for the range imaging with high contrast and the aperture pattern for the non-range imaging with high light transmissivity.

The present inventors have made the present invention as a result of the enthusiastic study under the above circumstances. The embodiments of the present invention will be described below. Note that the embodiments described below are exemplified for implementing the present invention, and do not limit the technical scope of the present invention. In the following embodiments, components having the same function are denoted by the same reference symbols, and the repetitive description thereof will be omitted unless otherwise required.

First Embodiment

Figure 1:
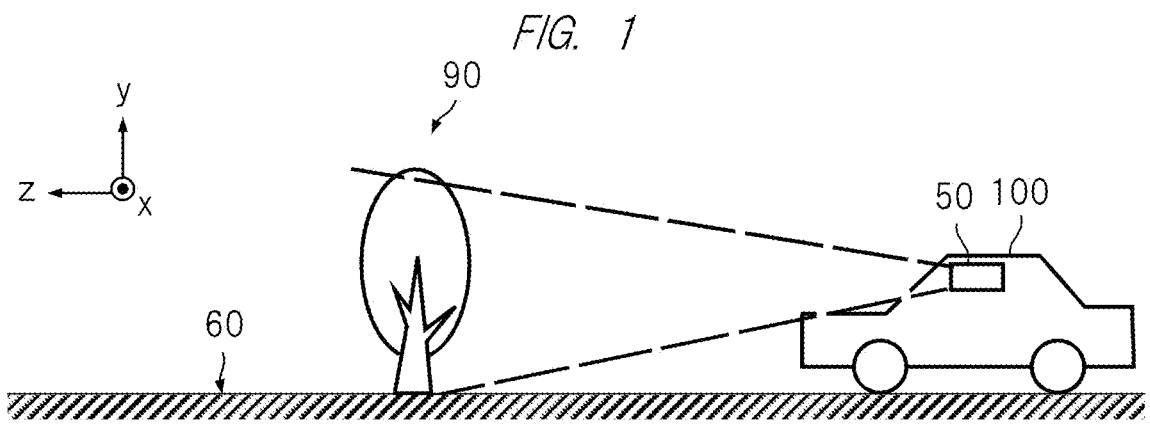
FIG. 1 is a diagram illustrating exemplary installation of an imaging system according to a first embodiment.

FIG. 1 is a diagram illustrating exemplary installation of an imaging system 50 according to a first embodiment. As illustrated in FIG. 1, the imaging system 50 is installed in an automobile 100 functioning as a transporter. The imaging system 50 is configured to capture an image of an object 90 ahead of the automobile 100. As illustrated in FIG. 1, in the present specification, the x direction is one direction parallel to a ground surface 60, the y direction is a vertical direction to the ground surface 60, and the z direction is a direction vertical to the x direction and the y direction. A forward moving direction of the automobile 100 is the z direction. Note that the imaging system 50 may be configured to capture an image of the object in not only the front direction but also other directions such as a rear direction, a side direction or the like.

<Exemplary Configuration of Imaging System According to First Embodiment>

Figure 2:
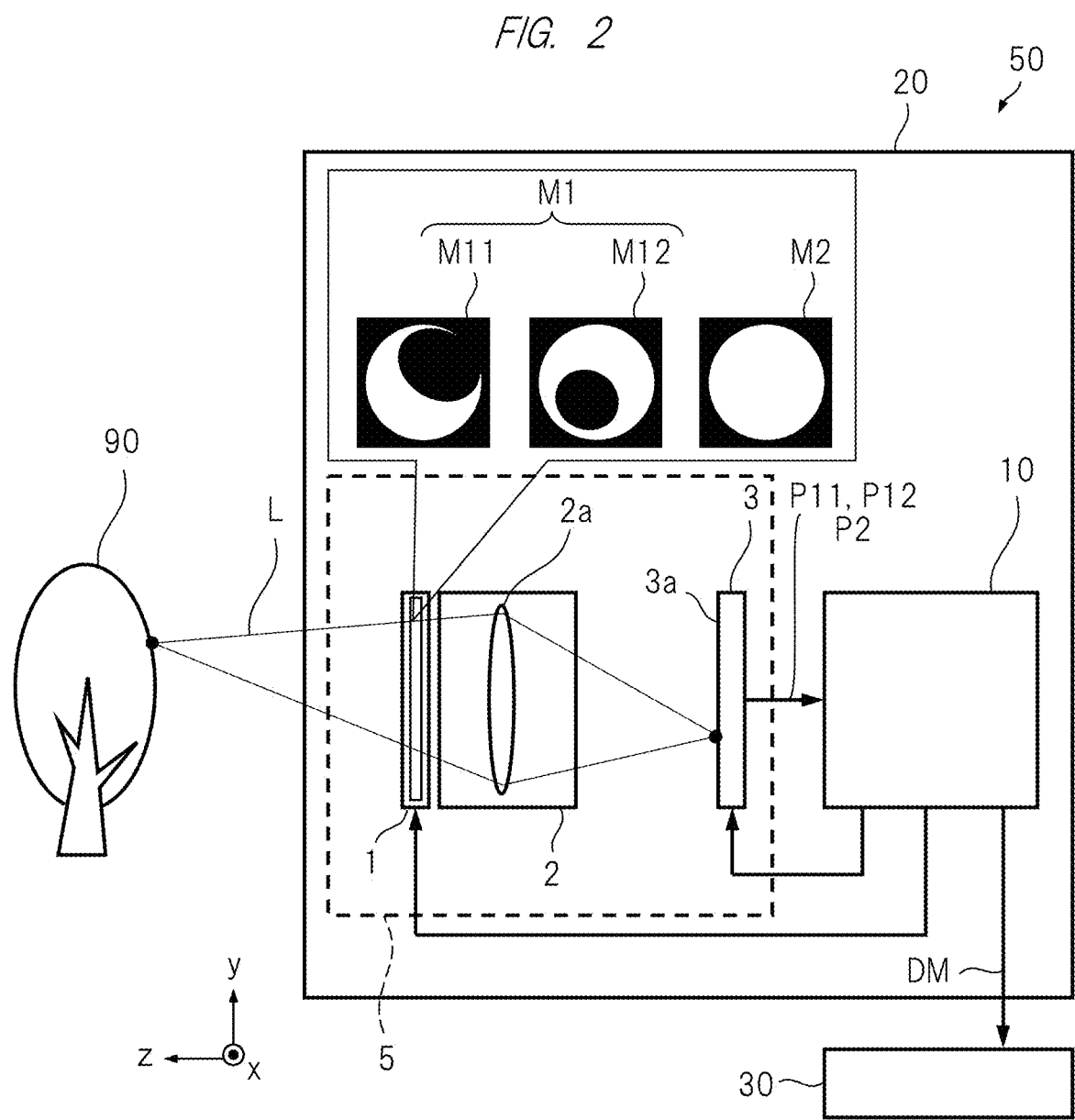
FIG. 2 is a diagram illustrating an exemplary configuration of the imaging system.

FIG. 2 is a diagram illustrating an exemplary configuration of the imaging system 50. As illustrated in FIG. 2, the imaging system 50 includes an imaging apparatus 20 and an external apparatus 30. The imaging apparatus 20 and the external apparatus 30 are electrically connected to each other, and are communicable with each other. Note that the external apparatus 30 is, for example, a driving assistance apparatus for a transporter. The driving assistance apparatus has, for example, an autonomous emergency braking function, a full-speed-range adaptive cruise control function, a lane departure warning (preventing) function, a unintended acceleration sudden prevention function and the like.

The imaging apparatus 20 includes an imaging system module 5 and a computational control processor 10. The imaging system module 5 includes a liquid crystal panel 1, an optical system 2, and an imaging element 3. The imaging element 3 and the computational control processor 10 electrically connected to each other, and the liquid crystal panel 1 and the computational control processor 10 are electrically connected to each other.

The optical system 2 condenses incident light emitted from the object 90 onto a light receiving surface 3a of the imaging element 3 to form an image. The optical system 2 includes, for example, a lens 2a. The lens 2a may be a single lens, a compound lens, a prime lens, or a zoom lens.

The light receiving surface 3a of the imaging element 3 is made of a plurality of two-dimensionally arranged photoelectric conversion elements. The imaging element 3 converts light L passing through the liquid crystal panel 1 and the optical system 2 and received by the light receiving surface 3a into an electric signal depending on the intensity of the light L, and outputs image data based on the electric signal to the computational control processor 10. Note that the imaging element 3 may output electric to a photoelectrically-converted signal the computational control processor 10, and the computational control processor 10 may obtain image data based on the electric signal. Note that the imaging element 3 is also called image sensor. The imaging element 3 is, for example, a CMOS image sensor.

The liquid crystal panel 1 is arranged between the optical system 2 and the object 90. However, the liquid crystal panel 1 may be arranged between the optical system 2 and the imaging element 3. The liquid crystal panel 1 does not include a backlight. When being controlled by the computational control processor 10, the liquid crystal panel 1 controls an incidence region of light which enters the optical system 2 from the object 90 and reaches the imaging element 3.

The liquid crystal panel 1 has an incident light control region. The incident light control region described here has a perfect circle shape viewed in the z direction, and is made of a plurality of regions. Each of the plurality of regions is a region where an orientation direction of the liquid crystals can be independently changed. In the liquid crystal panel 1, each region is set to be in a light absorption state or a light transmission state by changing the orientation direction of the liquid crystals at each region in the incident light control region, thereby forming a plurality of types of geometric patterns. The light absorption state is also called light shielded state or colored state, and the light transmission state is also called light passing state or transparent state. In the liquid crystal panel 1, the incidence region of the light L entering from the object 90 is controlled by forming the geometric patterns.

In the liquid crystal panel 1, a first aperture pattern M1 and a second aperture pattern M2 are formed as the geometric patterns. The first aperture pattern M1 functions as the aperture for the range imaging. The second aperture pattern M2 functions as the aperture for the non-range imaging (the aperture for the general imaging).

In the specification, the coded imaging is assumed as the range imaging, and a coded aperture is assumed as the aperture for the range imaging in this case. The first aperture pattern M1 is generally a pattern representing an aperture having a different shape from the perfect circle centering on the optical axis of the liquid crystal panel 1. The first aperture pattern M1 includes, for example, an aperture pattern M11, an aperture pattern M12 and the like as illustrated in FIG. 2. The second aperture pattern M2 is a pattern representing an aperture having, for example, the perfect circle shape centering on the optical axis of the liquid crystal panel 1. The optical axis of the liquid crystal panel 1 is an axis penetrating through the center or the center of gravity of the incident light control region and being vertical to the panel surface.

The computational control processor 10 controls the liquid crystal panel 1 and the imaging element 3, thereby performing the coded imaging or the general imaging. The computational control processor 10 obtains image data P2 of the object by performing the general imaging. The computational control processor 10 calculates an estimated value of a depth that is a perspective of each position of the object 90 from the imaging apparatus 20, based on the information which is obtained by decoding the image data P11 and P12 obtained by the coded imaging. The computational control processor 10 associates each pixel of an image portrayed by the image data P2 with an estimated depth value corresponding to the pixel, thereby generating and outputting a depth map DM.

<Exemplary Configuration of Computational Control Processor>

Figure 3:
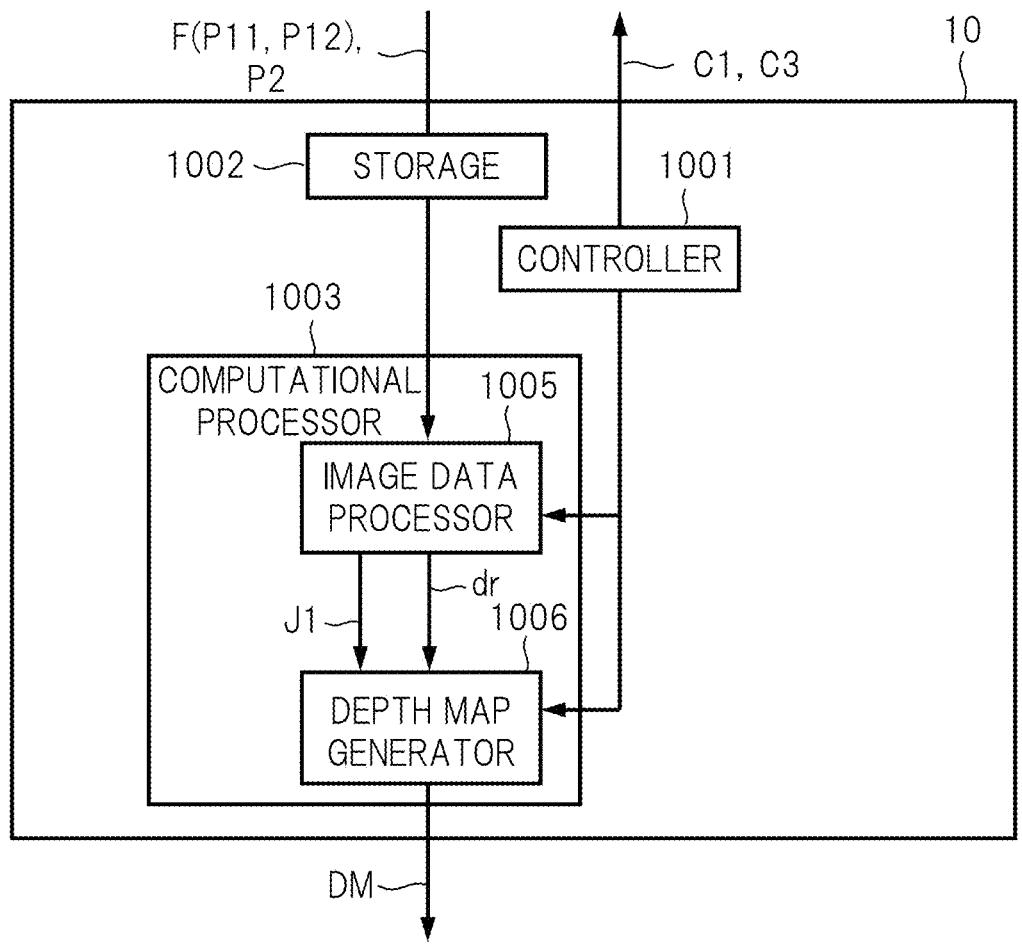
FIG. 3 is a diagram illustrating an exemplary configuration of a functional block in a computational control processor.

FIG. 3 is a diagram illustrating an exemplary configuration of functional blocks of the computational control processor. As illustrated in FIG. 3, the computational control processor 10 includes a controller 1001, a storage 1002, and a computational processor 1003. The computational processor 1003 includes an image data processor 1005 and a depth map generator 1006.

The controller 1001 transmits a control signal C1 to the liquid crystal panel 1 and transmits a control signal C3 to the imaging element 3, thereby performing the coded imaging and the general imaging on the object 90. The controller 1001 loads the image data P11 obtained by the coded imaging using the aperture pattern M11 as the coded aperture and the image data P12 obtained by the coded imaging using the aperture pattern M12 as the coded aperture from the imaging element 3 into the storage 1002. Also, the controller 1001 loads the image data P2 obtained by the general imaging using the second aperture pattern M2 as the aperture for the general imaging from the imaging element 3 into the storage 1002. In the specification, note that the image data P11 and the image data P12, which are temporally next to each other, are called one-frame captured image data F.

The controller 1001 transmits the control signal C1 to the liquid crystal panel 1 and transmits the control signal C3 to the imaging element 3 in order to load the one-frame captured image data F and the image data P2 repeatedly a plurality of times. For example, the controller 1001 controls the liquid crystal panel 1 and the imaging element 3 in order to perform a series of operations of forming the aperture pattern M11 on the liquid crystal panel 1, exposing the light receiving surface 3a of the imaging element 3 by the light L emitted from the object 90, loading the image data P11, forming the aperture pattern M12 on the liquid crystal panel 1, exposing the light receiving surface 3a of the imaging element 3 by the light L emitted from the object 90, and loading the image data P12. The controller 1001 controls the liquid crystal panel 1 and the imaging element 3 in order to perform the operations of forming the second aperture pattern M2 on the liquid crystal panel 1, exposing the light receiving surface 3a of the imaging element 3 by the light L emitted from the object 90, and loading the image data P2. The controller 1001 repeatedly performs the controls.

Based on the captured image data F, the image data processor 1005 performs the image data processings including a decoding processing using a point spread function in the imaging system for each loading of the one-frame captured image data F into the storage 1002, that is, each coded imaging for one frame. In the first embodiment, the image data processor 1005 obtains an estimated value of the depth that is the perspective "dr" of each position of the object 90 corresponding to each pixel of an object image J1 portrayed by the image data P2 by performing the decoding processing on the captured image data F. The depth of each position indicates the distance from the imaging system to each position of the object 90.

The depth map generator 1006 generates the depth map DM of the object 90, based on the object image J1 and the depths dr of the respective positions of the object 90. The depth map DM is the mapped depths of the respective positions of the object 90. The computational processor 1003 transmits the generated depth map DM to the external apparatus 30.

Figure 4:
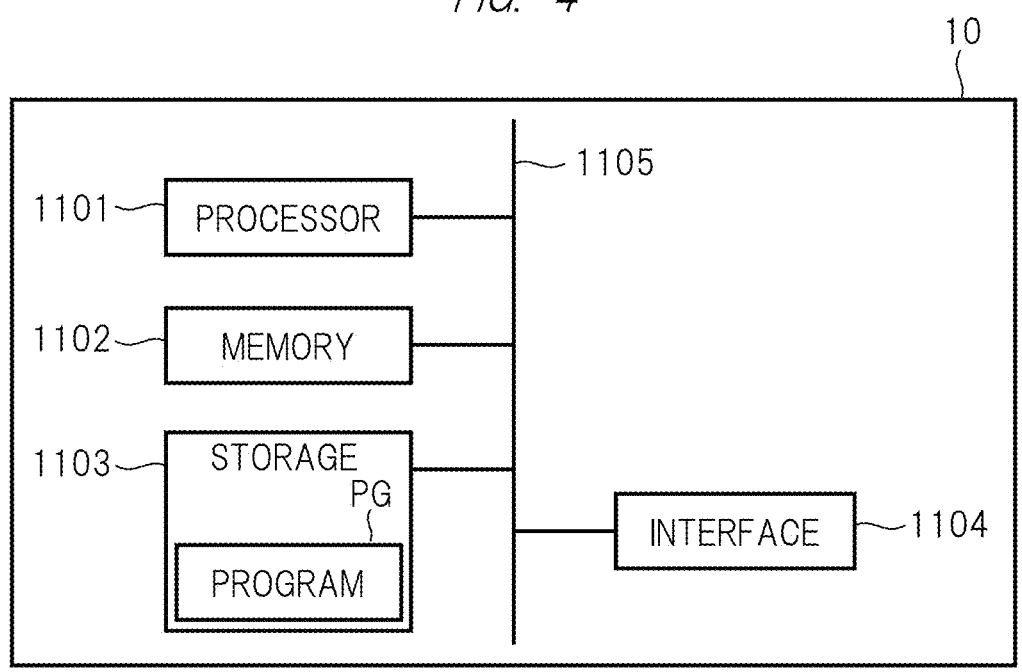
FIG. 4 is a diagram illustrating an exemplary hardware configuration of the computational control processor.

FIG. 4 is a diagram illustrating an exemplary hardware configuration of the computational control processor. As illustrated in FIG. 4, the computational control processor 10 includes a processor 1101, a memory 1102, a storage 1103, an interface 1104, and a communication bus 1105. The processor 1101, the memory 1102, the storage 1103, and the interface 1104 are connected to the communication bus 1105. The processor 1101 is, for example, a central processing unit (CPU), a microprocessor (MPU), a microcontroller (MCU) or the like. The memory 1102 is, for example, a semiconductor memory such as RAM, ROM, or EEPROM. The storage 1103 is, for example, a storage device such as a hard disk drive (HDD) or a solid state drive (SSD). The interface 1104 is to be connected to the external apparatus, and enables the data to be input/output to/from the external apparatus.

The memory 1102 or the storage 1103 stores a program PG. The processor 1101 reads the program PG, and loads it to the memory 1102, and executes it, thereby functioning as various functional blocks in cooperation with other devices. In the first embodiment, the processor 1101 functions as the various functional blocks ranging from the controller 1101 to the depth map generator 1106. Note that the storage 1103 may be eliminated while the program PG may be stored in the memory 1102. Some or all of the processor 1101 to the interface 1104 may be an integrally-formed integrated circuit or may be chipped.

<Exemplary Configuration of Liquid Crystal Panel>

Figure 5:
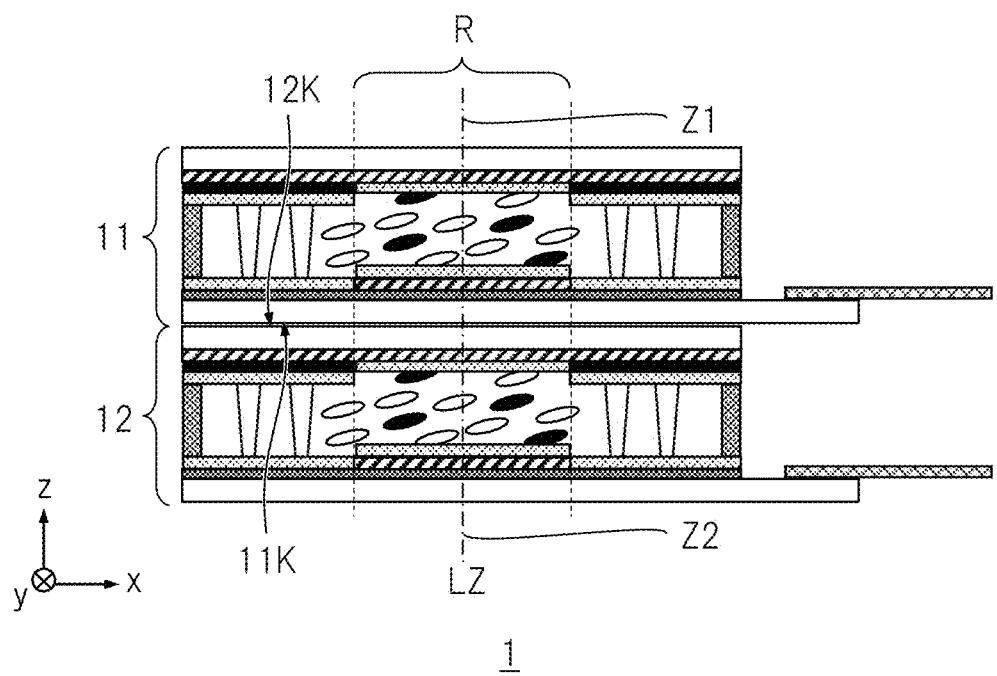
FIG. 5 is a side cross-sectional view of a liquid crystal panel.
Figure 6:
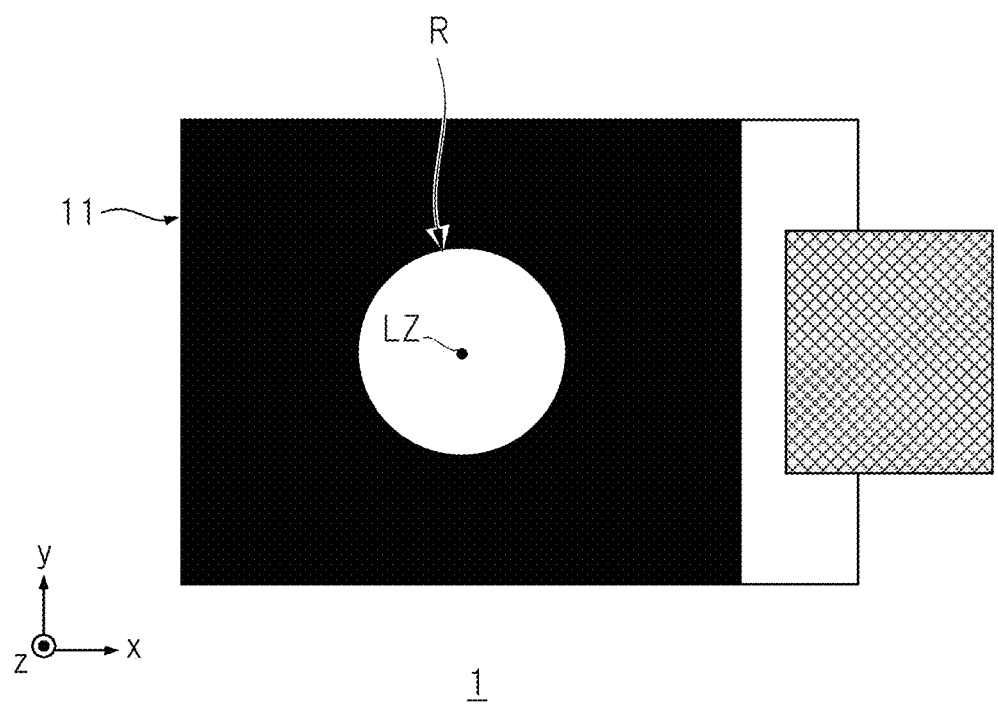
FIG. 6 is a front view of the liquid crystal panel.

FIG. 5 is a side cross-sectional view illustrating the liquid crystal panel. FIG. 6 is a front view of the liquid crystal panel. As illustrated in FIG. 5, the liquid crystal panel 1 includes a first liquid crystal cell 11 and a second liquid crystal cell 12.

The first liquid crystal cell 11 and the second liquid crystal cell 12 are arranged so as to cause respective one cell surfaces 11K and 12K that are in contact with or closely face each other. The first liquid crystal cell 11 and the second liquid crystal cell 12 are arranged so as to cause respective axes that are an optical axis Z1 of the first liquid crystal cell 11 and an optical axis Z2 of the second liquid crystal cell 12 parallel to or overlap each other. The optical axis Z1 and the optical axis Z2 are axes that generally pass through the center or the center of gravity of the incident light control regions in the liquid crystal cells and that are vertical to the cell surfaces, respectively. The optical axis LZ of the liquid crystal panel 1 is parallel to or overlaps the optical axis Z1 and the optical axis 22. In the first embodiment, note that the optical axis Z1 and the optical axis 22 overlap. The optical axis LZ of the liquid crystal panel 1 overlaps the optical axis Z1 and the optical axis 22, and is parallel thereto in the z direction.

As illustrated in FIG. 5, the incident light control region R has a column shape taking the optical axis LZ of the liquid crystal panel 1 as the center axis. As illustrated in FIG. 6, the incident light control region R has a perfect circle shape when being viewed along the z direction. As illustrated in FIGS. 5 and 6, each of the first liquid crystal cell 11 and the second liquid crystal cell 12 has a substantially rectangular shape, and has a substantially similar structure to each other.

Figure 7:
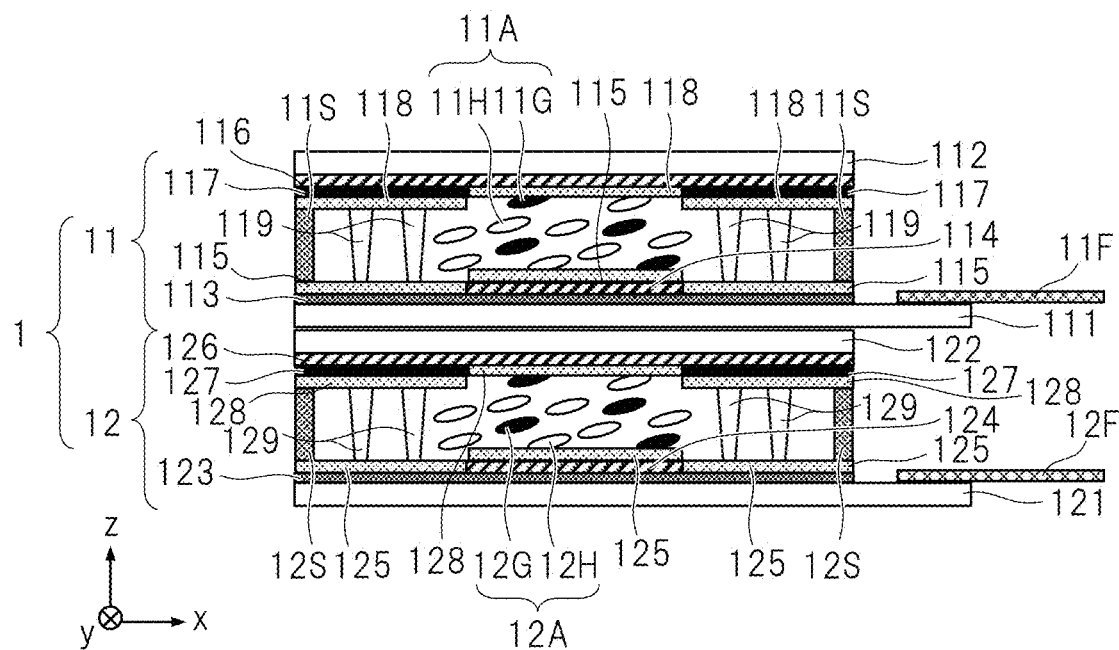
FIG. 7 is side cross-sectional views of a first liquid crystal cell and a second liquid crystal cell.
Figure 8:
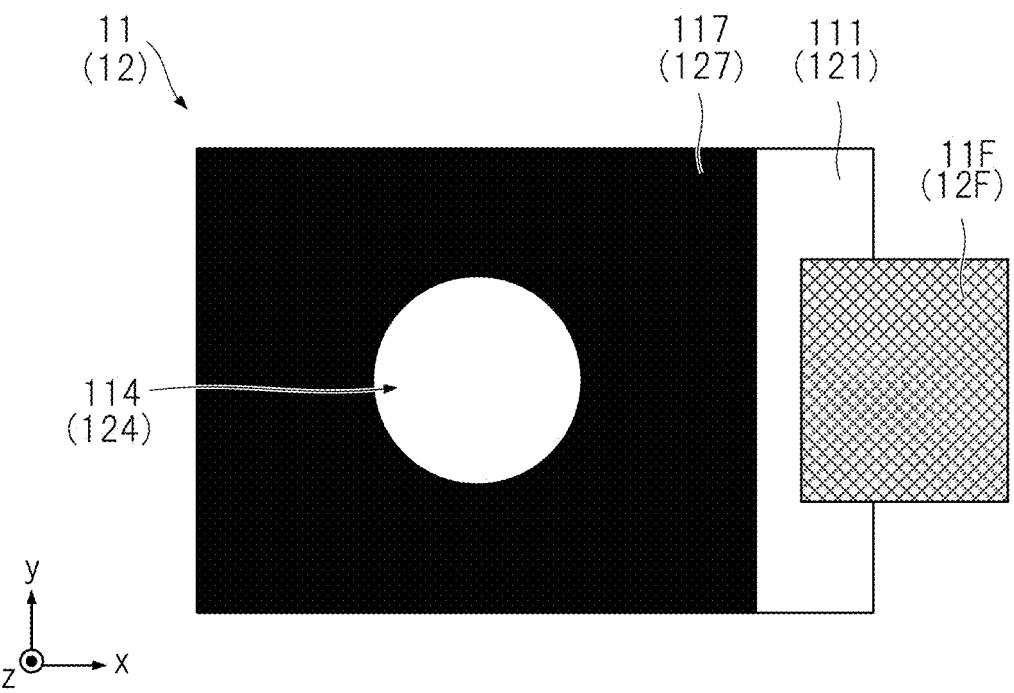
FIG. 8 is front views of the first liquid crystal cell and the second liquid crystal cell.

FIG. 7 is a side cross-sectional view of each of the first liquid crystal cell 11 and the second liquid crystal cell 12. FIG. 8 is a front view of each of the first liquid crystal cell 11 and the second liquid crystal cell 12.

Each of the first liquid crystal cell 11 and the second liquid crystal cell 12 is of the guest-host type. As illustrated in FIG. 7, the first liquid crystal cell 11 includes an array substrate 111, a counter substrate 112, an electrode driver circuit 113, an array substrate electrode 114, an array substrate orientation film 115, a counter substrate electrode 116, a light shielding member 117, a counter substrate orientation film 118, a spacer 119, a seal member 11S, first guest-host liquid crystals 11A, and a flexible substrate 11F.

The array substrate 111 and the counter substrate 112 are arranged so as to cause respective one substrate surfaces that face each other.

The electrode driver circuit 113 is arranged on the substrate surface of the array substrate 111. The array substrate electrode 114 is arranged in a region of the electrode driver circuit 113, the region corresponding to the incident light control region R, or arranged in a region including this region. The array substrate orientation film 115 is arranged to cover the array substrate electrode 114 and the electrode driver circuit 113.

The counter substrate electrode 116 is arranged on the counter substrate 112. The light shielding member 117 is arranged in a region of the counter substrate 112 and the counter substrate electrode 116, the region externally covering the region corresponding to the incident light control region R. The counter substrate orientation film 118 is arranged to cover the counter substrate electrode 116 and the light shielding member 117.

A plurality of the spacers 119 are provided between the array substrate orientation film 115 and the counter substrate orientation film 118, and the first guest-host liquid crystals 11A are arranged therebetween. The seal member 11S is arranged between the array substrate orientation film 115 and the counter substrate orientation film 118 to seal the first guest-host liquid crystals 11A.

The flexible substrate 11F is arranged on the array substrate 111. The flexible substrate 11F is electrically connected to the array substrate electrode 114 and the counter substrate electrode 116 through a wiring. The flexible substrate 11F is electrically connected to the controller 1001 through a wiring. Note that the wirings are not illustrated in FIGS. 7 and 8.

Each of the array substrate 111 and the counter substrate 112 has the light transmissivity, and is, for example, a glass substrate. Each of the array substrate electrode 114 and the counter substrate electrode 116 has the light transmissivity, and is a transparent electrode. The first guest-host liquid crystals 11A are made of dye molecules 11G and liquid crystal molecules 11H. The dye molecules 11G correspond to the guest, and are also called dichroic dye. The liquid crystal molecules 11H correspond to the host, and are also simply called liquid crystals. The dye molecule 11G has a minor axis direction and a major axis direction, and has the light absorptivity that is different depending on the axis direction that is the orientation direction. That is, the dye molecule 11G is anisotropic. The dye molecules 11G are oriented to follow movement of the liquid crystal molecules 11H, and produce the light absorption state and the light transmission state.

As similar to the first liquid crystal cell 11, the second liquid crystal cell 12 includes an array substrate 121, a counter substrate 122, an electrode driver circuit 123, an array substrate electrode 124, an array substrate orientation film 125, a counter substrate electrode 126, a light shielding member 127, a counter substrate orientation film 128, a spacer 129, a seal member 12S, second guest-host liquid crystals 12A, and a flexible substrate 12F. The second guest-host liquid crystals 12A are made of dye molecules 12G and liquid crystal molecules 12H. The arrangements and configurations of the components in the second liquid crystal cell 12 are similar to those in the first liquid crystal cell 11, and thus, will not be described herein.

Figure 9:
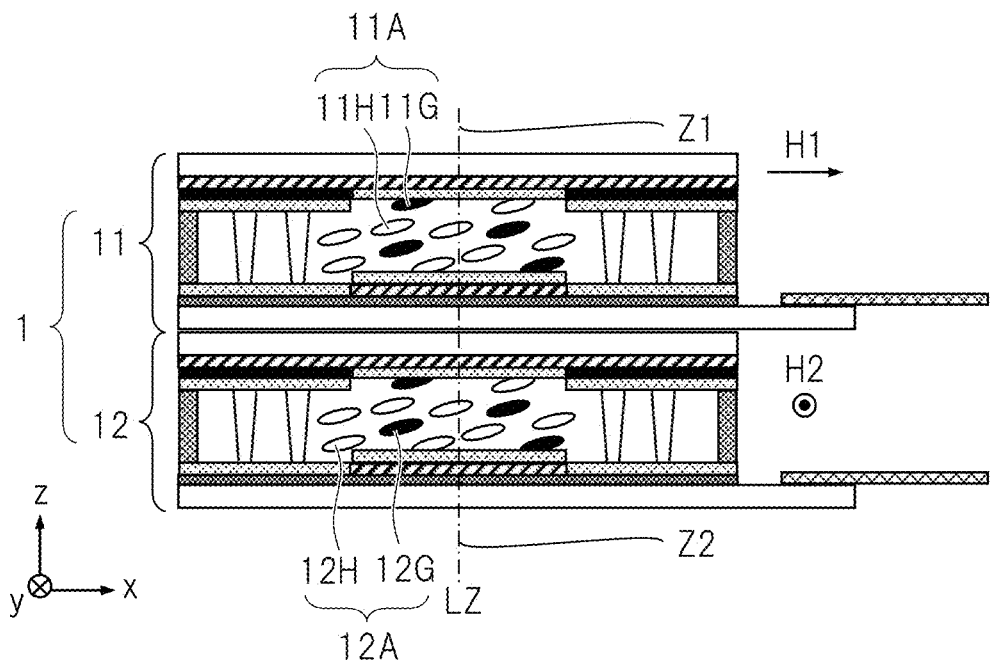
FIG. 9 is a diagram illustrating exemplary orientation directions of guest-host liquid crystals in the first liquid crystal cell and the second liquid crystal cell.
Figure 10:
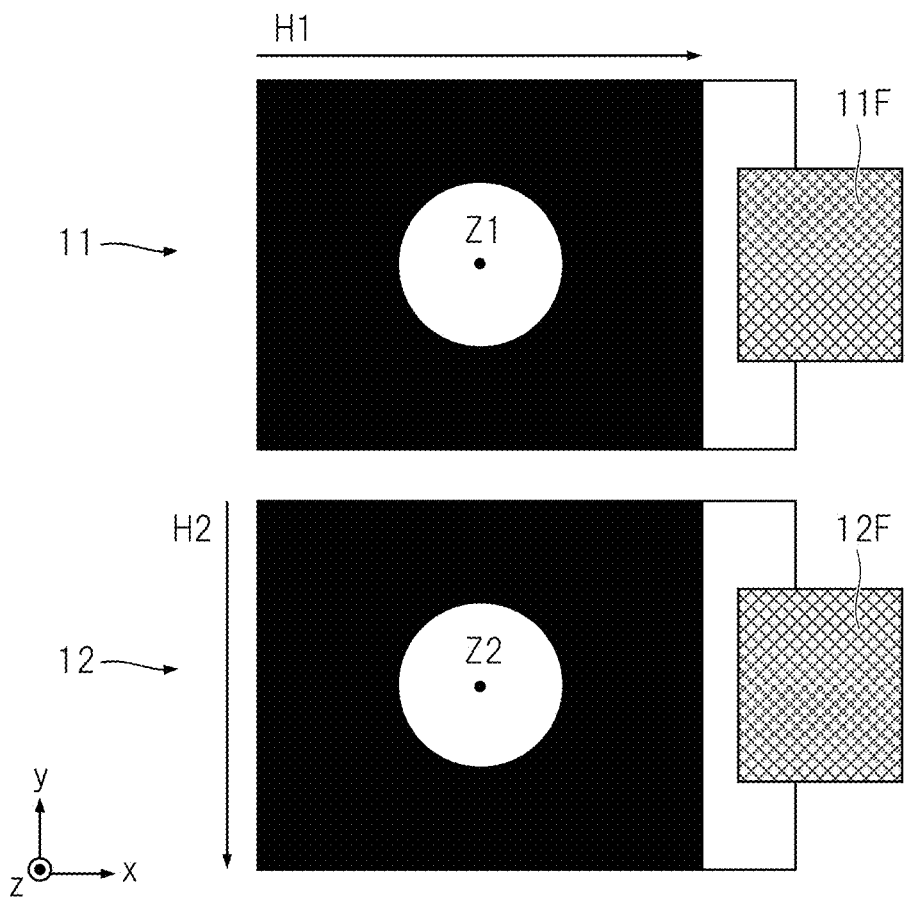
FIG. 10 is a diagram illustrating exemplary orientation directions of the guest-host liquid crystals in the first liquid crystal cell and the second liquid crystal cell.

Each of FIGS. 9 and 10 is a diagram illustrating the exemplary orientation direction of the guest-host liquid crystals in the first liquid crystal cell and the second liquid crystal cell. FIG. 9 is a side cross-sectional view of the first liquid crystal cell 11 and the second liquid crystal cell 12. FIG. 10 is a front view of the first liquid crystal cell 11 and the second liquid crystal cell 12.

As illustrated in FIGS. 9 and 10, the orientation direction of the first guest-host liquid crystals 11A in the first liquid crystal cell 11 is configured to be a first orientation direction H1 (first direction) vertical to an optical axis direction parallel to the optical axis 21 of the first liquid crystal cell 11 or to be the optical axis direction. The orientation direction of the second guest-host liquid crystals 12A in the second liquid crystal cell 12 is configured to be a second orientation direction H2 (second direction) vertical to an optical axis direction parallel to the optical axis 22 of the second liquid crystal cell 12 or to be the optical axis direction. The first orientation direction H1 and the second orientation direction H2 are vertical to each other.

In the first embodiment, the first orientation direction H1 is the x direction, and the second orientation direction H2 is the y direction. The optical axis direction parallel to the optical axis 21 and the optical axis direction parallel to the optical axis 22 are directions parallel to the optical axis LZ of the liquid crystal panel 1, in other words, the directions are the z direction.

<Modes of Guest-Host Liquid Crystals>

FIG. 11 is a diagram illustrating modes of the guest-host liquid crystals. As illustrated in FIG. 11, the modes of the guest-host liquid crystals include a normally closed mode and a normally open mode. In the normally closed mode, an "Electrically Controlled Birefringence (ECB)" mode is provided as the driving mode, absorptivity (colorability) is provided at voltage (electric field) OFF while transparency is provided at voltage ON, the liquid crystals are provided to be positive liquid crystals, the orientation direction is provided to be parallel to the liquid crystal cell surface, and the response time is provided to be several tens milliseconds. To the contrary, in the normally open mode, "Vertical Aligned (VA)" mode is provided as the driving mode, the transparency is provided at voltage OFF while the absorptivity (colorability) is provided at voltage ON, the liquid crystals are provided to be negative liquid crystals, the orientation direction is provided to be vertical to the liquid crystal cell surface, and the response time is provided to be several tens milliseconds.

FIG. 12 is a diagram for explaining a property of the guest-host liquid crystals in the normally closed mode. The guest-host liquid crystals in the normally closed mode are driven under the ECB mode. As illustrated in FIG. 12, the guest-host liquid crystals in the normally closed mode contain positive liquid crystals 41H as the host and dye molecules 41G as the guest. The direction vertical to the liquid crystal cell surface described here is assumed as a direction Z3. A horizontal orientation film in which the liquid crystals are oriented to be horizontal to the liquid crystal cell surface is used as the orientation film. When the guest-host liquid crystals are viewed from an observer's eye 40E along the direction Z3 at the voltage OFF, a major-axis side surface NC1 of the dye molecule 41G is observed, and the colored guest-host liquid crystals are observed. To the contrary, at the voltage ON, in other words, when an electric field EV is caused along the direction Z3, a minor-axis side surface NC2 of the dye molecule 41G is observed, and the transparent guest-host liquid crystals are observed.

FIG. 13 is a diagram for explaining a property of the guest-host liquid crystals in the normally open mode. The guest-host liquid crystals in the normally open mode are driven under the VA mode. As illustrated in FIG. 13, the guest-host liquid crystals in the normally open mode contain negative liquid crystals 42H as the host and dye molecules 42G as the guest. The direction vertical to the liquid crystal cell surface described here is assumed as the direction Z3. A vertical orientation film in which the liquid crystals are oriented to be vertical to the liquid crystal cell surface is used as the orientation film.

When the guest-host liquid crystals are viewed from the observer's eye 40E along the direction Z3 at the voltage OFF, a minor-axis side surface NO1 of the dye molecule 42G is observed, and the transparent guest-host liquid crystals are observed. To the contrary, at the voltage ON, in other words, when the electric field EV is caused along the direction Z3, a major-axis side surface NO2 of the dye molecule 42G is observed, and the colored guest-host liquid crystals are observed. The dye molecules 42G are generally colored with black, but may be colored with a color other than black.

In the first embodiment, the modes of the guest-host liquid crystals in the first and second liquid crystal cells 11 and 12 are set as the same mode. The mode adopts the normally open mode or the VA mode. Specifically, the first guest-host liquid crystals 11A are oriented in the first orientation direction H1 in a space where the electric field is caused, and is oriented in the z direction in a space where the electric field in the z direction is not caused. The second guest-host liquid crystals 12A are oriented in the second orientation direction H2 in a space where the electric field is caused, and is oriented in the z direction in a space where the electric field in the z direction is not caused.

In the first embodiment, note that the first liquid crystal cell 11 and the second liquid crystal cell 12 which configure the liquid crystal panel 1 have the mutually similar configurations, while their orientation directions of the guest-host liquid crystals in the space where the electric field is caused are vertical to each other. That is, in the liquid crystal panel 1 according to the first embodiment, two guest-host liquid crystal cells, whose liquid-crystal orientation directions are different from each other by 90°, are overlapped such that the polarizing axes thereof are vertical to each other. In such a configuration, the flexible substrate 11F of the first liquid crystal cell 11 and the flexible substrate 12F of the second liquid crystal cell 12 are positioned on the same side as each other. Consequently, the wirings for connecting the flexible substrates 11F, 12F and the computational control processor 10 are easily collected, and therefore, the imaging apparatus 20 can be easily designed.

In the liquid crystal shutter (liquid crystal panel) in the normally open mode, no voltage is applied thereto in capturing an image not including the distance information while the liquid crystal shutter is driven only in capturing an image including the distance information, thereby reducing power consumption.

<Comparison in Contrast Between Single Cell Case and Overlapped Two Cell Case of Guest-Host Liquid Crystals>

Figure 14:
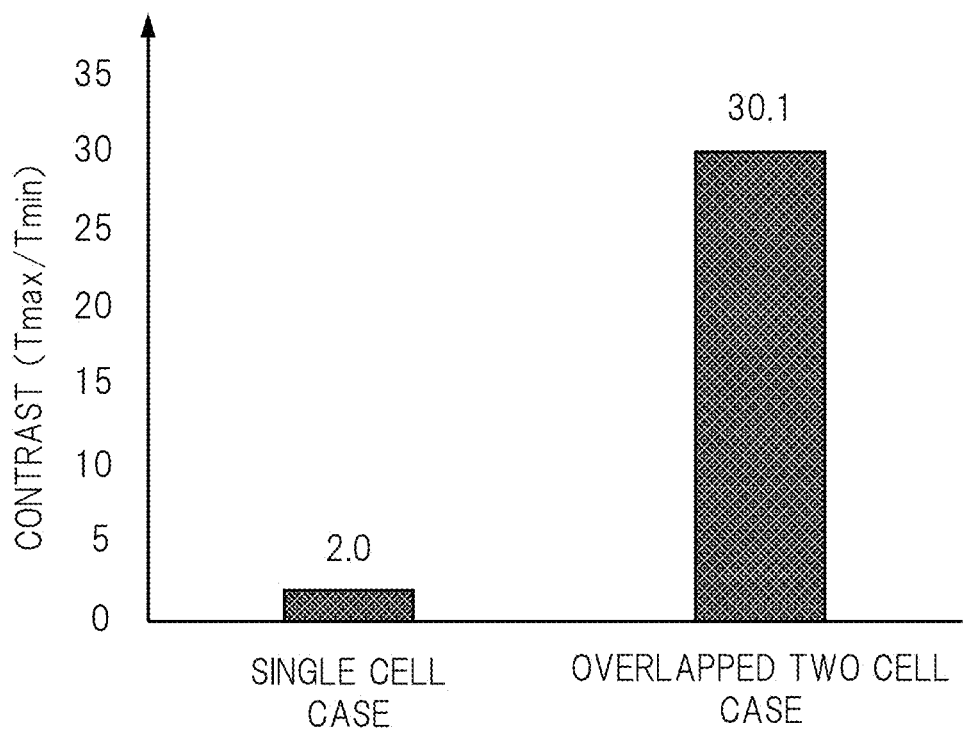
FIG. 14 is a diagram illustrating exemplary contrasts in a single cell case and an overlapped two cell case of guest-host liquid crystals.

FIG. 14 is a diagram illustrating exemplary contrasts of a single cell case and an overlapped two cell case of the guest-host liquid crystals. The single cell case is a case in which the number of the liquid crystal cells with a predetermined gap thickness between the array substrate and the counter substrate is one. The overlapped two cell case is a case in which two liquid crystal cells with the predetermined gap thickness are overlapped such that the polarizing axes thereof are vertical to each other.

The contrast is obtained as, for example, follows. First, the electric field caused in the space of the liquid crystal cell is controlled to control the orientation direction at each region in the guest-host liquid crystals, thereby forming a predetermined geometric pattern in the incident light control region. Then, the maximum transmissivity Tmax of light in the formed pattern and the minimum transmissivity Tmin in the same pattern are measured, thereby providing a value which is obtained by dividing Tmax by Tmin as the contrast.

As illustrated in FIG. 14, in an exemplary experiment, while the contrast in the single cell case is 2.0, the contrast in the overlapped two cell case is 30.1. Therefore, when two guest-host liquid crystal cells are overlapped such that the polarizing axes thereof are vertical to each other, the contrast in the pattern formed in the liquid crystal panel can be drastically improved.

<Electrode Structures of Liquid Crystal Cells>

Figure 15:
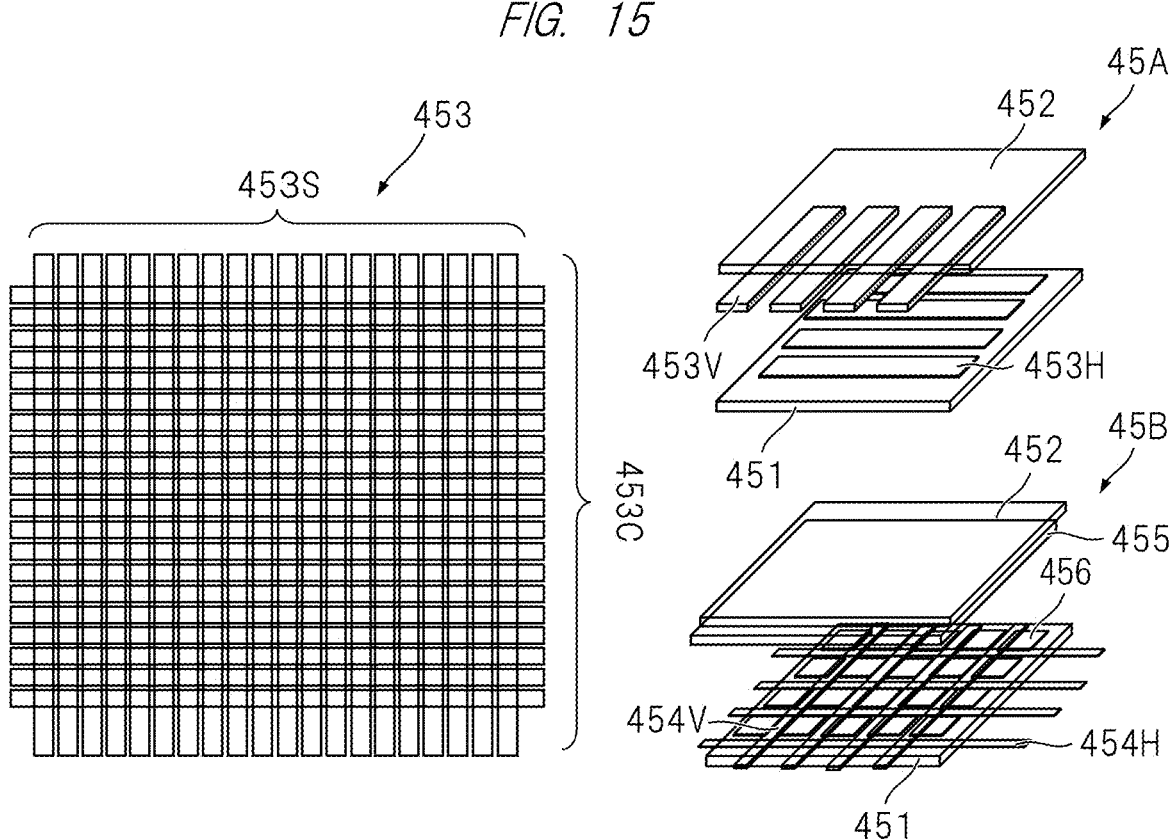
FIG. 15 is a diagram illustrating exemplary electrode structures in the first liquid crystal cell and the second liquid crystal cell.

FIG. 15 is a diagram illustrating exemplary electrode structures in the first liquid crystal cell and the second liquid crystal cell. Each of the first and second liquid crystal cells 11 and 12 according to the first embodiment has a so-called vertical electric field structure in which the electric field is caused in the z direction. The geometric pattern forming system in the first and second liquid crystal cells 11 and 12, that is, a display system therein is assumed as a matrix system. As illustrated in the left side of FIG. 15, the matrix system adopts, for example, an electrode structure 453 in which a plurality of signal electrodes 453S and a plurality of scanning electrodes 453C are arranged to cross each other. The signal electrodes 453S are a group of a plurality of electrodes extending in the y direction are arranged in the x direction. The scanning electrodes 453C are a group of a plurality of electrodes extending in the x direction are arranged in the y direction.

A region corresponding to a crossing point of the signal electrode 453S and the scanning electrode 453C forms a pixel region. When the voltage to be applied to the signal electrodes 453S and the scanning electrodes 453C is controlled to cause the electric field in a target pixel region, the liquid crystals in the electric field are oriented to have the light absorptivity or the light transmissivity.

In order to achieve the matrix display system, for example, a simple matrix structure 45A as illustrated in the upper right of FIG. 15 or an active matrix structure 45B as illustrated in the lower right of FIG. 15 is used. In the simple matrix structure 45A, one of two mutually facing glass substrates 451 and 452 is provided with a belt-shaped electrode 453H, and the other is provided with a belt-shaped electrode 453V. The belt-shaped electrode 453H and the belt-shaped electrode 453V are arranged to cross each other, and the liquid crystals are sandwiched therebetween. The pixel is formed at the crossing region of the belt-shaped electrode 453H and the belt-shaped electrode 453V.

In the active matrix structure 45B, one of the two mutually facing glass substrates 451 and 452 is provided with a scanning line 454H and a data line 454V, and the other is provided with a plate electrode 455. The scanning line 454H and the data line 454V are arranged to cross each other. An active element such as a transistor is arranged in correspondence with the crossing point of the scanning line 454H and the data line 454V, and the active element is connected to a transparent electrode 456 corresponding to the pixel. When an "ON" signal is input into the scanning line 454H and the data line 454V, a potential is caused in the corresponding transparent electrode 456, and the electric field is generated between the plate electrode 455 and the transparent electrode 456.

<Operations of Controller for Liquid Crystal Cells>

When each of the first and second liquid crystal cells 11 and 12 adopts the simple matrix structure as the electrode structure, the controller 1001 controls the voltage to be applied to each electrode, thereby controlling the electric field at each pixel region, and forming an optional geometric pattern in the first and second liquid crystal cells 11 and 12. When each of the first and second liquid crystal cells 11 and 12 adopts the active matrix structure as the electrode structure, the controller 1001 controls a signal to be input into each scanning line and each data line, thereby controlling the electric field at each pixel region, and forming an optional geometric pattern in the first and second liquid crystal cells 11 and 12. By such control of the controller 1001, an optional aperture pattern can be formed in the liquid crystal panel 1.

As described above, the liquid crystal panel 1 according to the first embodiment has the structure of the overlapped two liquid crystal cells, whose orientation directions of the guest-host liquid crystals are vertical to each other, in other words, are labelled to be different from each other by 90° from each other. The liquid crystal cells using the guest-host liquid crystals does not need a polarizer. The guest-host liquid crystals contain the dye molecules, and function as similar to the polarizer when the guest-host liquid crystals are oriented in the labeled orientation direction. Thus, the light transmissivity in the colored case of the guest-host liquid crystals of the two liquid crystal cells is drastically reduced, and the light transmissivity in the transparent case of the guest-host liquid crystals of the two liquid crystal cells is improved.

Therefore, according to the first embodiment, while contrast of an aperture for range imaging is kept in the liquid crystal panel for imaging to control light incidence regions, light transmissivity of an aperture for non-range imaging or an aperture for general imaging can be improved.

In the first embodiment, note that the first liquid crystal cell 11 and the second liquid crystal cell 12 have the similar structures except for the labelled orientation direction of the guest-host liquid crystals, and overlap each other without changing the orientation direction of the liquid crystal cells. Thus, in the electric field control at each matrix-arranged pixel region in the incident light control region, the first liquid crystal cell 11 and the second liquid crystal cell 12 may be similarly controlled. Therefore, in forming the aperture pattern, the first liquid crystal cell 11 and the second liquid crystal cell 12 are easily controlled. In this case, the flexible substrate 11F and the flexible substrate 12F are positioned on the same side as each other, and therefore, the wirings to be connected to the flexible substrates 11F and 12F are easily collected.

First Modification Example

Figure 16:
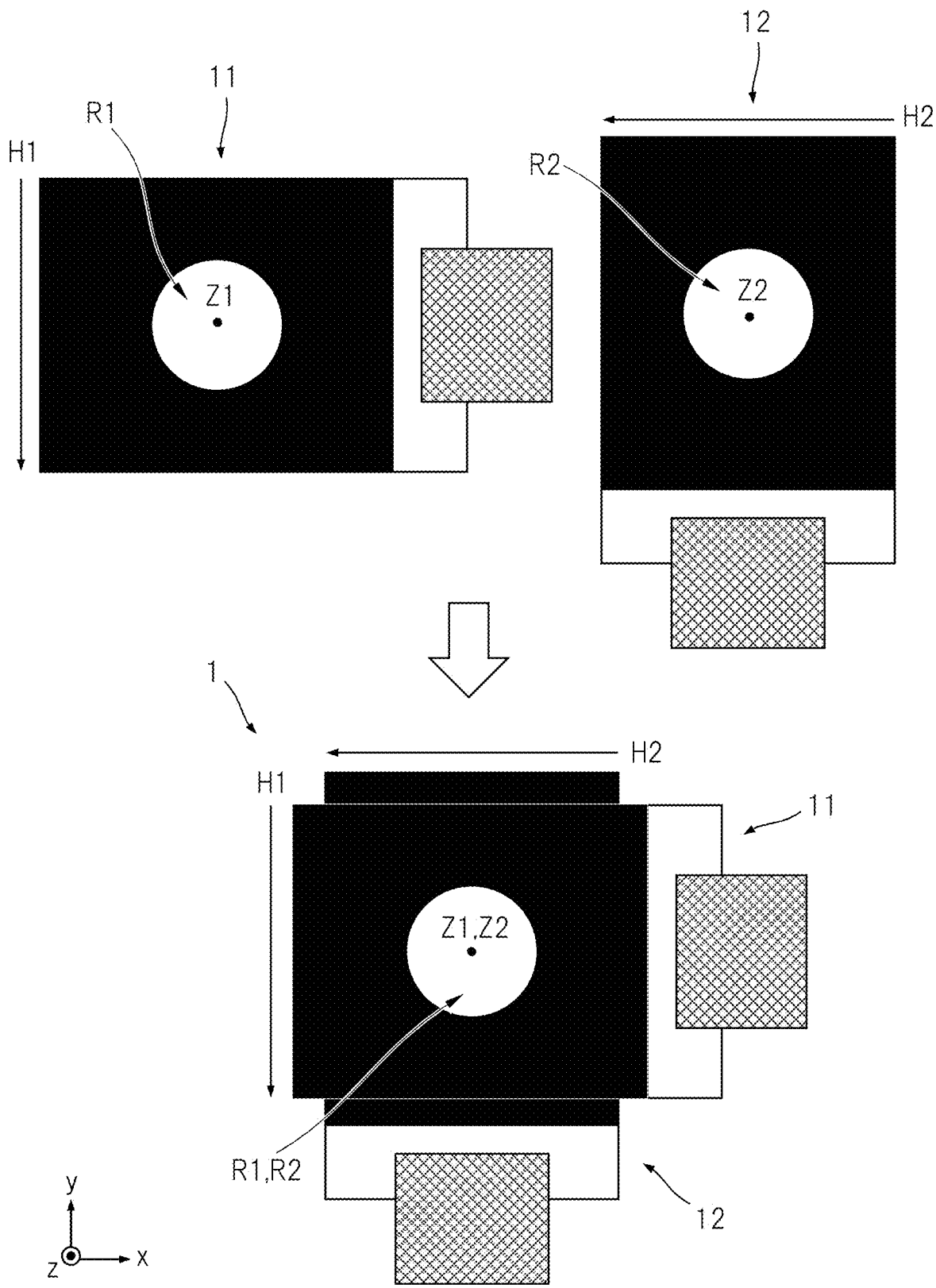
FIG. 16 is a diagram for explaining a first modification example of the first embodiment.

FIG. 16 is a diagram for explaining a first modification example of the first embodiment. In the first modification example, the first liquid crystal cell 11 and the second liquid crystal cell 12 have the similar structure also including the labelled orientation direction of the guest-host liquid crystals. As illustrated in FIG. 16, the first liquid crystal cell 11 is a liquid crystal cell with a first specification of labelling the first orientation direction H1 of the guest-host liquid crystals to be a specific direction (vertically herein) relative to the liquid crystal cell. The second liquid crystal cell 12 is a liquid crystal cell obtained by rotating the liquid crystal cell with the first specification of labelling the second orientation direction H2 of the guest-host liquid crystals to be the specific direction relative to the liquid crystal cell by 90° around the optical axis direction of the first liquid crystal cell 11 relative to the first liquid crystal cell 11. In this case, the first liquid crystal cell 11 and the second liquid crystal cell 12 are arranged such that the optical axis Z1 of the first liquid crystal cell 11 and the optical axis Z2 of the second liquid crystal cell 12 overlap each other, in other words, an incident light control region R1 and an incident light control region R2 overlap each other.

According to the first modification example, the liquid crystal panel 1 can be configured by overlapping the two liquid crystal cells with the same specification while rotating them by 90° relative to each other. Thus, the manufacturing cost of the liquid crystal cells can be reduced.

Second Modification Example

In the first embodiment, as the range imaging, the stereo imaging may be performed instead of the coded imaging. In this modification example, the first aperture pattern M1 formed in the liquid crystal panel 1, in other words, the aperture patterns M11 and M12 function as two types of diaphragms used for the stereo imaging. The two types of diaphragms used for the stereo imaging are different from each other in an aperture position relative to the imaging element 3. By performing an image processing on the captured image data F under use of a triangulation method, the image data processor 1005 provides an unblurred object image J1 expressing the object 90 and the depth dr at each position of the object 90 corresponding to each pixel of the object image J1.

Also in the second modification example, as similar to the effects of the first embodiment, in the liquid crystal panel for the imaging to control the light incidence region, the light transmissivity of the aperture for the non-range imaging that is the aperture for the general imaging can be improved while the contrast of the aperture for the range imaging is secured.

Third Modification Example

In the first embodiment, the incident light control region including the guest-host liquid crystals is made of the matrix-arranged pixel regions. However, the incident light control region may be made of a plurality of segment regions. That is, in the first embodiment, the pattern forming system is the matrix system while the electrode structure of the liquid crystal cell is the matrix structure. However, the pattern forming system may be a segment system while the electrode structure of the liquid crystal cell may be a segment structure. Generally, in the segment structure, one of the array substrate electrode and the counter substrate electrode is made of a plate electrode while the other is made of a plurality of segment electrodes.

Note that the segment electrodes in the first liquid crystal cell and the segment electrodes in the second liquid crystal cell, which are configured such that the corresponding segment electrodes in the z direction have the same shape and the same size as each other while both the liquid crystal cells overlap each other.

Figure 17:
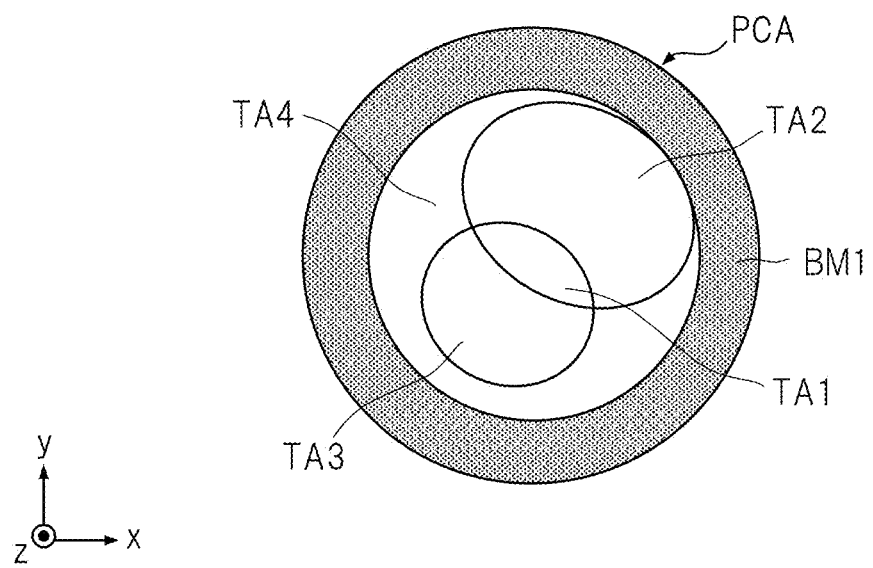
FIG. 17 is a diagram illustrating an exemplary structure 1 of segment electrodes in the first liquid crystal cell and the second liquid crystal cell.

FIG. 17 is a diagram illustrating an exemplary structure 1 of the segment electrode in the first liquid crystal cell and the second liquid crystal cell. As illustrated in FIG. 17, a structure PCA of the segment electrode in the exemplary structure 1 is a structure in which a plurality of segment electrodes TA1, TA2, TA3, and TA4 are arranged inside an annular light shielding member BM1. The aperture pattern for the coded imaging, that is, the coded aperture can be formed by bringing only (the guest-host liquid crystals of) the regions corresponding to the segment electrodes TA1 and TA2 into the light absorption state or bringing only the regions corresponding to the segment electrodes TA1 and TA3 into the light absorption state. To the contrary, the aperture pattern for the general imaging, that is, the diaphragm can be formed by bringing the regions corresponding to the segment electrodes TA1 to TA4 into the light transmission state.

Figure 18:
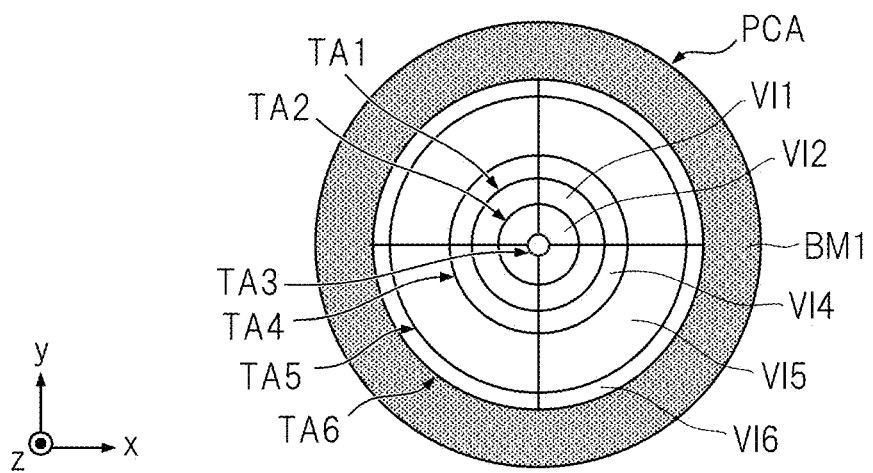
FIG. 18 is a diagram illustrating an exemplary structure 2 of segment electrodes in the first liquid crystal cell and the second liquid crystal cell.

FIG. 18 is a diagram illustrating an exemplary structure 2 of the segment electrode in the first liquid crystal cell and the second liquid crystal cell. As illustrated in FIG. 18, the structure PCA of the segment electrode in the exemplary structure 2 includes segment electrodes TA1 to TA6. For example, the segment electrode TA1 is annular, the segment electrode TA2 is annular and is surrounded by the segment electrode TA1, and the segment electrode TA3 is circular and is surrounded by the segment electrode TA2. Each of the segment electrodes TA4 to TA6 is annular.

Each of the segment electrodes TA1, TA2 and TA4 to TA6 includes a plurality of circumferentially sectioned electrodes. The segment electrode TA1 includes a plurality of sectioned electrodes VI1, the segment electrode TA2 includes a plurality of sectioned electrodes VI2, the segment electrode TA4 includes a plurality of sectioned electrodes VI4, the segment electrode TA5 includes a plurality of sectioned electrodes VI5, and the segment electrode TA6 includes a plurality of sectioned electrodes VI6.

In the exemplary structure 2, the number of sections of each of the segment electrodes TA1, TA2 and TA4 to TA6 is four that is the same as one another. In this example, each of the segment electrodes TA1, TA2 and TA4 to TA6 is divided by four. The boundaries between the sectioned electrodes VI1, the boundaries between the sectioned electrodes VI2, the boundaries between the sectioned electrodes VI4, the boundaries between the sectioned electrodes VI5, and the boundaries between the sectioned electrodes VI6 are radially aligned inside the circle formed by the inner circumference of the light shielding member BM1. The sectioned electrodes VI1 to VI6 (except VI3) are electrically insulated.

The segment electrode TA3 can be used as a pinhole region. A light shielding layer is not provided between radially adjacent segment electrodes TAn (n=1, 2, . . . , 6). The segment electrodes TA1 to TA6 are concentrically positioned. Thus, the liquid crystal panel 1 can open and close the diaphragm.

Discuss the segment electrode TA1 and the segment electrode TA2 here. In the liquid crystal panel 1, during a period in which the entire segment electrode TA1 is set in the light absorption state, the entire segment electrode TA2 can be set to the light transmission state or the light absorption state. Further, in the liquid crystal panel 1, during a period in which the entire segment electrode TA1 is set to the light transmission state, the entire segment electrode TA2 can be set to the light transmission state.

In the liquid crystal panel 1, when at least one of the segment electrode TA1 and the segment electrode TA2 is set to the light transmission state, the imaging element 3 can obtain the information on visible light emitted from the object 90 and transmitting through the liquid crystal panel 1. Thereby, the imaging element 3 can capture the image of the object 90. From the imaging element 3, the controller 1001 can obtain not only the distance information on the object 90 (the distance information between the imaging apparatus 20 and the object 90) but also the image information on the object 90.

Figure 19:
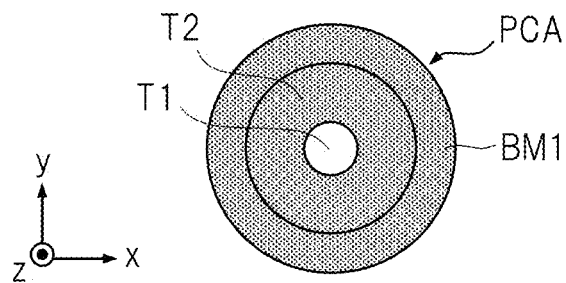
FIG. 19 is a diagram illustrating an exemplary structure 3 of segment electrodes in the first liquid crystal cell and the second liquid crystal cell.

FIG. 19 is a diagram illustrating an exemplary structure 3 of the segment electrode in the first liquid crystal cell and the second liquid crystal cell. As illustrated in FIG. 19, the structure PCA of the segment electrode in the exemplary structure 3 is a structure in which an annular segment electrode T2 is arranged inside the annular light shielding member BM1 while a circular segment electrode T1 is arranged inside the segment electrode T2. A diaphragm with a small area of the light transmission region can be formed by bringing the region corresponding to the segment electrode T2 to the light absorption state while bringing the region corresponding to the segment electrode T1 to the light transmission state. A diaphragm with a large area of the light transmission region can be formed by bringing the regions corresponding to the segment electrode T2 and the segment electrode T1 to the light transmission state.

Figure 20:
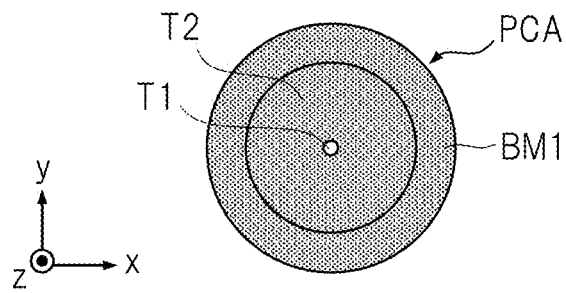
FIG. 20 is a diagram illustrating an exemplary structure 4 of segment electrodes in the first liquid crystal cell and the second liquid crystal cell.

FIG. 20 is a diagram illustrating an exemplary structure 4 of the segment electrode in the first liquid crystal cell and the second liquid crystal cell. As illustrated in FIG. 20, the structure PCA of the segment electrode in the exemplary structure 4 is a structure in which the annular segment electrode T2 with a large with is arranged inside the annular light shielding member BM1 while the pinhole-shaped segment electrode T1 is arranged inside the segment electrode T2. The pinhole-shaped diaphragm with a remarkably small area of the light transmission region can be formed by bringing the region corresponding to the segment electrode T2 to the light absorption state while bringing the region corresponding to the segment electrode T1 to the light transmission state. A diaphragm with a large area of the light transmission region can be formed by bringing the regions corresponding to the segment electrode T2 and the segment electrode T1 to the light transmission state.

Figure 21:
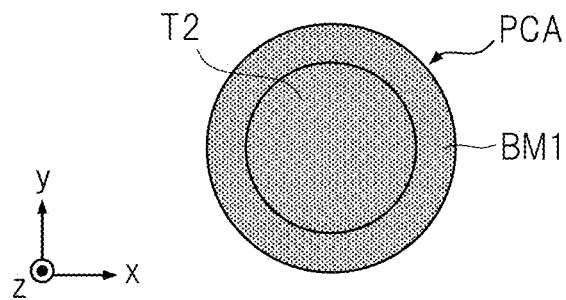
FIG. 21 is a diagram illustrating an exemplary structure 5 of segment electrodes in the first liquid crystal cell and the second liquid crystal cell.

FIG. 21 is a diagram illustrating an exemplary structure 5 of the segment electrode in the first liquid crystal cell and the second liquid crystal cell. As illustrated in FIG. 21, the structure PCA of the segment electrode in the exemplary structure 5 is a structure in which the circular segment electrode T2 is arranged inside the annular light shielding member BM1 so as to correspond to the entire region of the inside. The shutter is opened by bringing the region corresponding to the segment electrode T2 to the light transmission state, and the shutter is closed by bringing the region corresponding to the segment electrode T2 to the light absorption state.

Figure 22:
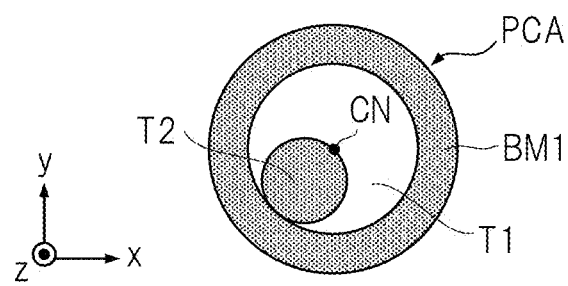
FIG. 22 is a diagram illustrating an exemplary structure 6 of segment electrodes in the first liquid crystal cell and the second liquid crystal cell.

FIG. 22 is a diagram illustrating an exemplary structure 6 of the segment electrode in the first liquid crystal cell and the second liquid crystal cell. As illustrated in FIG. 22, the structure PCA of the segment electrode in the exemplary structure 6 is a structure in which the segment electrode T1 and the segment electrode T2 are arranged inside the annular light shielding member BM1. The segment electrode T2 is an electrode having the shape of a circle centering a position shifting from the center CN of the incident light control region. The segment electrode T1 is an electrode corresponding to a region of the entire region inside the light shielding member BM1, the region excluding the region of the segment electrode T2. The coded aperture can be formed by bringing the region corresponding to the segment electrode T2 to the light absorption state. The diaphragm for the general imaging can be formed by bringing the regions corresponding to the segment electrodes T1 and T2 to the light transmission state.

Figure 23:
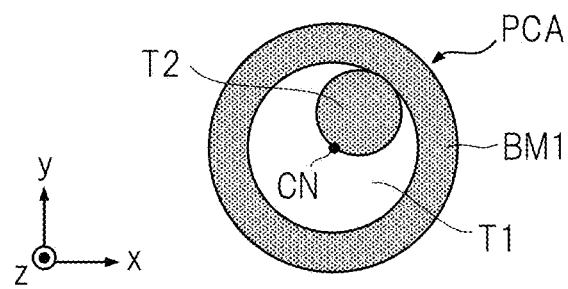
FIG. 23 is a diagram illustrating an exemplary structure 7 of segment electrodes in the first liquid crystal cell and the second liquid crystal cell.

FIG. 23 is a diagram illustrating an exemplary structure 7 of the segment electrode in the first liquid crystal cell and the second liquid crystal cell. As illustrated in FIG. 23, the structure PCA of the segment electrode in the exemplary structure 7 is similar to that in the exemplary structure 6, and is a structure in which the center of the segment electrode T2 is at a different position from that in the exemplary structure 6. Also in the exemplary structure 7, the coded aperture and the diaphragm for the general imaging can be formed as similar to the exemplary structure 6.

Figure 24:
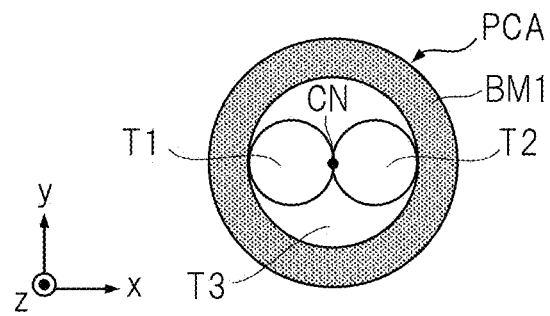
FIG. 24 is a diagram illustrating an exemplary structure 8 of segment electrodes in the first liquid crystal cell and the second liquid crystal cell.

FIG. 24 is a diagram illustrating an exemplary structure 8 of the segment electrode in the first liquid crystal cell and the second liquid crystal cell. As illustrated in FIG. 24, the structure PCA of the segment electrode in the exemplary structure 8 is a structure in which the segment electrodes T1, T2, and T3 are arranged inside the annular light shielding member BM1. The segment electrode T1 and the segment electrode T2 have the shape of the circle (perfect circle) of the same size as each other. The respective diameters of the segment electrode T1 and the segment electrode T2 are half the inner diameter of the light shielding member BM1. The segment electrode T1 and the segment electrode T2 are arranged in the x direction, and are in contact with each other. The segment electrode T3 has a shape corresponding to a region of the entire region inside the light shielding member BM1, the region excluding the regions of the segment electrode T1 and the segment electrode T2.

The coded aperture or the aperture for the stereo imaging can be formed by bringing only the region corresponding to the segment electrode T1 among the segment electrodes T1 to T3 to the light transmission state or bringing only the region corresponding to the segment electrode T2 to the light transmission state. The diaphragm for the general imaging can be formed by bringing the regions corresponding to the segment electrodes T1 to T3 to the light transmissions state.

As described above, the aperture for the desired coded imaging, stereo imaging or general imaging can be formed by forming the structure of the segment electrodes in the first liquid crystal cell 11 and the second liquid crystal cell 12 to be the desired structure. By the adoption of the segment electrode structure, the regions to be controlled can be made less than those of the matrix electrode structure, and the control for the voltage to be applied to the electrodes can be made easier.

OTHER EMBODIMENTS

The imaging system according to the first embodiment has been described above, and an imaging method in accordance with a flow of processings in the imaging system 50 is also an embodiment of the present invention.

A program for causing the processor to function as the controller 1001 according to the first embodiment, and a tangible storage medium for non-transitorily storing the program are also embodiments of the present invention.

In the foregoing, various embodiments of the present invention have been described. However, the present invention is not limited to the foregoing embodiments, and various modifications are applicable. Further, the numerical values and the like in the description and the drawings are merely exemplary values, and the different values do not lose the effect of the present invention.

For example, the above-described embodiments are the example of the imaging system 50 installed in the automobile. However, the imaging system 50 may be installed in a transporter or a moving apparatus other than the automobile. The imaging system 50 may be installed in, for example, a transporter or an apparatus moving on the ground, in the sky, at the sea, or under the sea. More specifically, the imaging system 50 may be installed in, for example, a railway or monorail vehicle, a motorcycle, a bicycle, a ship, a submarine, an airplane, a drone, various types of an unmanned survey vehicle, an unmanned transporter, and the like. Even in the exemplary installations, the imaging system 50 can produce effects similar to those of the above embodiments, and can be used for the driving assistance technique. Additionally, the imaging system 50 may be not mounted on the transporter or the moving apparatus, and be used solely.

What is claimed is:

1. A liquid crystal panel comprising:
a first liquid crystal cell; and
a second liquid crystal cell,
wherein the first liquid crystal cell and the second liquid crystal cell are arranged such that one cell surface of the first liquid crystal cell and one cell surface of the second liquid crystal cell are in contact with or close to face each other and such that an optical axis of the first liquid crystal cell and an optical axis of the second liquid crystal cell are parallel to or overlap with each other,
in an incident light control region of the first liquid crystal cell,
the first liquid crystal cell is configured to
include first guest-host liquid crystals capable of taking an orientation direction to be a first direction vertical to a direction of the optical axis of the first liquid crystal cell or to be the direction of the optical axis, and
change in the orientation direction of the first guest-host liquid crystals at each region when being controlled by an electric field at the region in the incident light control region of the first liquid crystal cell, to form a first aperture pattern functioning as an aperture for range imaging and a second aperture pattern functioning as an aperture for non-range imaging,
in an incident light control region of the second liquid crystal cell,
the second liquid crystal cell is configured to
include second guest-host liquid crystals capable of taking an orientation direction to be a second direction vertical to a direction of the optical axis of the second liquid crystal cell and vertical to the first direction or to be the direction of the optical axis, and
change in the orientation direction of the second guest-host liquid crystals at each region when being controlled by an electric field at the region in the incident light control region of the second liquid crystal cell, to form the first aperture pattern and the second aperture pattern.

2. The liquid crystal panel according to claim 1,
wherein a mode of the first guest-host liquid crystals is a normally closed mode or a normally open mode, and
a mode of the second guest-host liquid crystals is a normally closed mode or a normally open mode.

3. The liquid crystal panel according to claim 2,
wherein a mode of the first guest-host liquid crystals and a mode of the second guest-host liquid crystals are the same as each other.

4. The liquid crystal panel according to claim 1,
wherein a pattern forming system in the incident light control region of each of the first liquid crystal cell and the second liquid crystal cell is a matrix system.

5. The liquid crystal panel according to claim 1,
wherein a pattern forming system in the incident light control region of each of the first liquid crystal cell and the second liquid crystal cell is a segment system.

6. The liquid crystal panel according to claim 1,
wherein the first liquid crystal cell is a liquid crystal cell with a first specification of labelling the orientation direction of the guest-host liquid crystals to be a specific direction relative to the liquid crystal cell, and
the second liquid crystal cell is a liquid crystal cell obtained by rotating the liquid crystal cell with the first specification by 90° around the direction of the optical axis of the first liquid crystal cell relative to the first liquid crystal cell.

7. The liquid crystal panel according to claim 1,
wherein the first aperture pattern is an aperture pattern functioning as an aperture for coded imaging, and
the second aperture pattern is an aperture pattern functioning as an aperture having a circle shape centering on an optical axis of the liquid crystal panel.

8. The liquid crystal panel according to claim 1,
wherein the first aperture pattern is an aperture pattern functioning as an aperture for stereo imaging, and
the second aperture pattern is an aperture pattern functioning as an aperture having a circle shape centering on an optical axis of the liquid crystal panel.

9. An imaging system module comprising:
an optical system, a liquid crystal panel, and an imaging element,
wherein the imaging element receives light passing through the optical system and the liquid crystal panel,
the liquid crystal panel includes:
   a first liquid crystal cell; and
   a second liquid crystal cell,
the first liquid crystal cell and the second liquid crystal cell are arranged such that one cell surface of the first liquid crystal cell and one cell surface of the second liquid crystal cell are in contact with or close to face each other and such that an optical axis of the first liquid crystal cell and an optical axis of the second liquid crystal cell are parallel to or overlap with each other,
in an incident light control region of the first liquid crystal cell,
the first liquid crystal cell is configured to
   include first guest-host liquid crystals capable of taking an orientation direction to be a first direction vertical to a direction of the optical axis of the first liquid crystal cell or to be the direction of the optical axis, and
   change in the orientation direction of the first guest-host liquid crystals at each region when being controlled by an electric field at the region in the incident light control region of the first liquid crystal cell, to form a first aperture pattern functioning as an aperture for range imaging and a second aperture pattern functioning as an aperture for non-range imaging,
in an incident light control region of the second liquid crystal cell,
the second liquid crystal cell is configured to
   include second guest-host liquid crystals capable of taking an orientation direction to be a second direction vertical to a direction of the optical axis of the second liquid crystal cell and vertical to the first direction or to be the direction of the optical axis, and
   change in the orientation direction of the second guest-host liquid crystals at each region when being controlled by an electric field at the region in the incident light control region of the second liquid crystal cell, to form the first aperture pattern and the second aperture pattern.

10. An imaging apparatus comprising:
an optical system, a liquid crystal panel, an imaging element, and a controller,
wherein the imaging element receives light passing through the optical system and the liquid crystal panel,
the liquid crystal panel includes:
   a first liquid crystal cell; and
   a second liquid crystal cell,
the first liquid crystal cell and the second liquid crystal cell are arranged such that one cell surface of the first liquid crystal cell and one cell surface of the second liquid crystal cell are in contact with or close to face each other and such that an optical axis of the first liquid crystal cell and an optical axis of the second liquid crystal cell are parallel to or overlap with each other,
in an incident light control region of the first liquid crystal cell,
the first liquid crystal cell is configured to
   include first guest-host liquid crystals capable of taking an orientation direction to be a first direction vertical to a direction of the optical axis of the first liquid crystal cell or to be the direction of the optical axis, and
   change in the orientation direction of the first guest-host liquid crystals at each region when being controlled by an electric field at the region in the incident light control region of the first liquid crystal cell, to form a first aperture pattern functioning as an aperture for range imaging and a second aperture pattern functioning as an aperture for non-range imaging,
in an incident light control region of the second liquid crystal cell,
the second liquid crystal cell is configured to
   include second guest-host liquid crystals capable of taking an orientation direction to be a second direction vertical to a direction of the optical axis of the second liquid crystal cell and vertical to the first direction or to be the direction of the optical axis, and
   change in the orientation direction of the second guest-host liquid crystals at each region when being controlled by an electric field at the region in the incident light control region of the second liquid crystal cell, to form the first aperture pattern and the second aperture pattern, and
the controller is configured to
   control the liquid crystal panel and the imaging element such that the first aperture pattern is formed in the first liquid crystal cell and the second liquid crystal cell to perform the range imaging, and
   control the liquid crystal panel and the imaging element such that the second aperture pattern is formed in the first liquid crystal cell and the second liquid crystal cell to perform the non-range imaging.

11. The imaging apparatus according to claim 10,
wherein the range imaging is coded imaging or stereo imaging.

12. The imaging apparatus according to claim 11, comprising:
a computational processor,
wherein the computational processor is configured to, based on a captured image obtained by the coded imaging or the stereo imaging, calculate an estimated value of a depth of an object included in the captured image.

13. The imaging apparatus according to claim 12, wherein the computational processor is configured to generate a depth map, based on the calculated estimated value of the depth of the object.

* * * * *